No. 744,687. PATENTED NOV. 17, 1903.
T. B. LEE.
AMALGAMATOR AND CONCENTRATOR.
APPLICATION FILED JUNE 22, 1903.
NO MODEL.
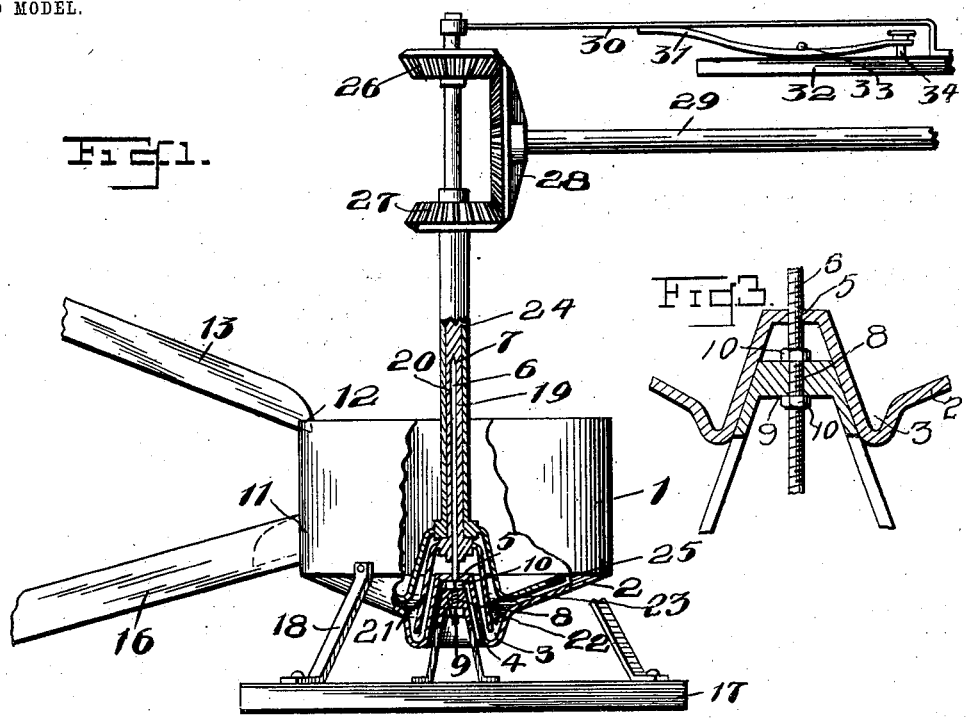
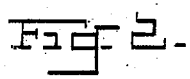
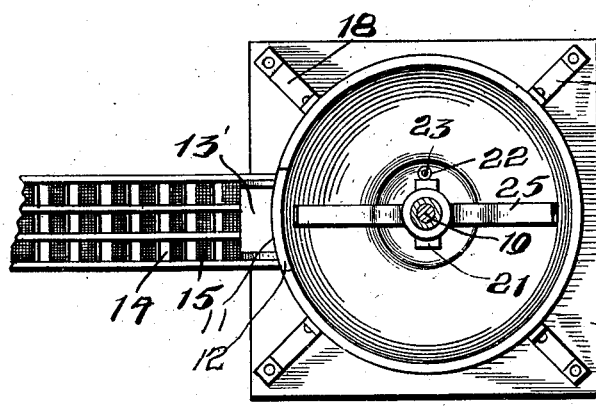
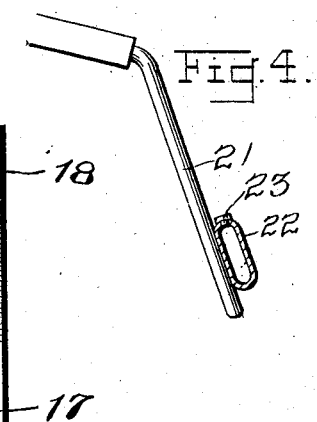
Witnesses
Inventor
T. B. Lee.
By H. B. Wilson,
Attorney
THE NORRIS PETERS CO., PHOTO-LITHO., WASHINGTON, D. C.

No. 744,687. Patented November 17, 1903.

UNITED STATES PATENT OFFICE.

THOMAS B. LEE, OF HESPERUS, COLORADO.

AMALGAMATOR AND CONCENTRATOR.

SPECIFICATION forming part of Letters Patent No. 744,687, dated November 17, 1903.

Application filed June 22, 1903. Serial No. 162,616. (No model.)

*To all whom it may concern:*

Be it known that I, THOMAS B. LEE, a citizen of the United States, residing at Hesperus, in the county of La Plata and State of Colorado, have invented certain new and useful Improvements in Amalgamators and Concentrators; and I do declare the following to be a full, clear, and exact description of the invention, such as will enable others skilled in the art to which it appertains to make and use the same.

My invention is an improved concentrating-amalgamator for flour and float gold; and it consists in the construction and combination of devices hereinafter described and claimed.

In the accompanying drawings, Figure 1 is partly an elevation and partly a vertical sectional view of the concentrating-amalgamator embodying my improvements. Fig. 2 is a top plan view of the same, partly in section, on the line $a\,a$ of Fig. 1. Fig. 3 is a detail section view. Fig. 4 is a detail view of the cyanid-containing vessel.

In the embodiment of my invention I provide an amalgamating and concentrating vessel 1, which is here shown as cylindrical in form and the bottom of which has downwardly-converging sides 2. At the center of the bottom of the vessel is formed an annular depression, which constitutes an amalgamating-pocket 3, and that portion of the bottom of the vessel which is surrounded by the said pocket is of conical form, as at 4, and is provided at its upper end with an opening 5, which is centrally located with reference to the bottom of the vessel.

A spindle 6 has its upper end pointed, as at 7, and has its lower portion screw-threaded for a suitable distance, as at 8, the said screw-threaded portion of the spindle passing through the opening 5 and engaging the threaded bore of a block 9, which is disposed in the conical portion 4 of the bottom of the vessel.

Nuts 10, with which the screw-threaded portion of the spindle is provided, bear, respectively, on the upper side and against the under side of the block 9 and serve to secure the spindle firmly in place, as shown in Fig. 1.

The vessel 1 is provided in one side at a suitable level with a discharge-opening 11 for water and sludge, and is also provided at its upper edge with an opening 12, in which is seated the lower end of a sluice 13, which conducts the sludge to the vessel. On the outer side of the opening 11 is a discharge spout or lip 13'. This spout or lip 13' is downwardly inclined at a suitable angle, is of suitable width, and the same extends outwardly for a suitable distance beyond the vessel 1 and is provided with Hungarian riffles 14, under which is a piece of burlap or other suitable material 15. A discharge-box sluice 16 for the sludge is fed by the said lip or spout, and the said box-sluice is also provided in its under side with similar riffles and burlap.

The vessel 1 is here shown as supported above a base 17 by inclined supporting-legs 18. A vertically-disposed shaft 19 is bored at its lower end for a suitable distance, as at 20, the length and diameter of the said bore being such as to enable it to fit on the upper portion of the spindle 6, the said spindle thus forming a bearing for the lower end of the said shaft 19. The latter is provided at its lower end with wings 21, which extend downwardly into and rotate in the pocket 3 when the said shaft is rotated. One of the said wings 21 is provided with a vessel 22, here shown as of tubular form, adapted to contain cyanid or other chemical, having its lower end provided with a suitable number of minute perforations and provided at its upper end with a suitable closure, as at 23. The said cyanid-containing vessel is also rotated in the amalgamating-pocket when the shaft 19 is revolved, as will be understood.

A tubular shaft 24 is disposed on the lower portion of the shaft 19 and is stepped on the enlargement at the lower end of the latter, which carries the amalgamating-wings 21. The said shaft 24 is provided at its lower end with wings or paddles 25, which project radially therefrom and which are bent to conform to the contour of the bottom of the vessel 1 and closely approach the same, the function of the said wings or paddles 25 being to prevent the fine gold from settling on the bottom of the vessel and to cause the same to settle in the amalgamating-pocket.

Within the scope of my invention any preferred means may be employed for revolving the shafts 19 and 24. For the purpose of this specification I show the shaft 19 as provided with a beveled gear-wheel 26 and the tubular shaft 24 as provided with a reversely-disposed similar gear-wheel 27. The said gears are engaged by a similar master-gear 28, carried by a shaft 29, which may be driven either by a water-wheel or by any other suitable motor. It will be understood that the gear 28, in connection with the gears 26 27 simultaneously revolve the shafts 19 and 24, which carry the stirrers, in opposite directions.

To reduce friction between the lower portions of the shaft 19 and the spindle 6, on which it revolves, I provide an adjustable support 30, having a bearing for the upper end of the said shaft 19 and in which the latter is swiveled. A spring 31 bears under the said support 30 and bears upon a suitable support 32. This spring forms a lever, which is adapted to rock on its central portion 33. The inner end of the said lever bears under the support 30, and the outer end thereof is provided with an adjusting-screw 34. By appropriately turning the said adjusting-screw the tension of the spring may be varied, and hence the support 30 may be vertically adjusted at will and the shaft 19 caused to bear to any desired extent frictionally upon the upper end of the spindle 6.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a machine of the class described, a vessel having a bottom, and an amalgamating-pocket depending therefrom, revoluble stirrers to operate on the bottom and in the pocket, and a vessel carried by the stirrer in the pocket, having means to feed a chemical therefrom.

2. In a machine of the class described, the combination with a vessel, of a revoluble shaft vertically disposed, having a stirrer to operate in the vessel, a tubular shaft on the first-mentioned shaft having a stirrer to operate in the vessel, reversely-disposed gears on said shaft and tubular shaft, a driving-gear engaging said gears to simultaneously reversely rotate them and the shafts, an adjustable support having a bearing for the upper end of the first-mentioned shaft in which bearing said shaft is swiveled, a spring bearing under said adjustable support, and means to vary the tension of said spring to regulate the friction of the bearing at the lower end of the first-mentioned shaft, substantially as described.

In testimony whereof I have hereunto set my hand in presence of two subscribing witnesses.

THOMAS B. LEE.

Witnesses:
JOHN BRADFORD,
JOHN STRAYER.